United States Patent
Uchida

(10) Patent No.: US 12,463,196 B2
(45) Date of Patent: Nov. 4, 2025

(54) ELECTRODE FOR NONAQUEOUS ELECTROLYTE SECONDARY BATTERIES, AND NONAQUEOUS ELECTROLYTE SECONDARY BATTERY

(71) Applicant: Panasonic Intellectual Property Management Co., Ltd., Osaka (JP)

(72) Inventor: Shuhei Uchida, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 684 days.

(21) Appl. No.: 17/788,104

(22) PCT Filed: Oct. 15, 2020

(86) PCT No.: PCT/JP2020/038923
§ 371 (c)(1),
(2) Date: Jun. 22, 2022

(87) PCT Pub. No.: WO2021/131255
PCT Pub. Date: Jul. 1, 2021

(65) Prior Publication Data
US 2023/0042333 A1    Feb. 9, 2023

(30) Foreign Application Priority Data
Dec. 26, 2019    (JP) .................. 2019-237117

(51) Int. Cl.
*H01M 4/13*    (2010.01)
*H01M 4/02*    (2006.01)

(52) U.S. Cl.
CPC ........ *H01M 4/13* (2013.01); *H01M 2004/021* (2013.01)

(58) Field of Classification Search
CPC .......... H01M 4/13; H01M 4/62; H01M 4/624; H01M 4/366; H01M 2004/021
See application file for complete search history.

(56) References Cited

U.S. PATENT DOCUMENTS

| | | |
|---|---|---|
| 4,440,836 A | 4/1984 | Bailey |
| 9,564,638 B2 * | 2/2017 | Uemura ................. H01M 4/62 |
| (Continued) | | |

FOREIGN PATENT DOCUMENTS

| | | | |
|---|---|---|---|
| CN | 107039640 A * | 8/2017 | ............. B82Y 30/00 |
| CN | 110235287 A | 9/2019 | |
| (Continued) | | | |

OTHER PUBLICATIONS

Office Action dated Oct. 4, 2022, issued in counterpart IN Application No. 202247036102, with English Translation. (7 pages).

(Continued)

*Primary Examiner* — Amanda C. Walke
(74) *Attorney, Agent, or Firm* — WHDA, LLP

(57) ABSTRACT

This electrode for nonaqueous electrolyte secondary batteries is provided with a collector, an active material layer that is formed on the collector, and an assembly of filler particles, said assembly being present on the surface of the active material layer. The filler particles contain at least one of boron oxide, potassium pyrosulfate and a compound containing an alkali metal or Br, while having a transformation point, at which the filler particles undergo a transformation from a solid phase to a liquid phase or a thermal decomposition, within the range of from 180° C. to 650° C. The compound containing an alkali metal or Br contains at least one of a borate, a silicate, a carbonate, a hydrogen carbonate, a citrate or an aromatic compound.

5 Claims, 2 Drawing Sheets

(56) References Cited

U.S. PATENT DOCUMENTS

| | | | |
|---|---|---|---|
| 11,532,813 B2* | 12/2022 | Tsujimura | H01M 4/525 |
| 2014/0186682 A1 | 7/2014 | Koyama et al. | |
| 2015/0179998 A1 | 6/2015 | Kagami et al. | |
| 2016/0056457 A1 | 2/2016 | Ogata et al. | |
| 2016/0308208 A1 | 10/2016 | He et al. | |
| 2017/0155133 A1* | 6/2017 | Lee | H01M 4/62 |
| 2018/0159182 A1 | 6/2018 | Hellstrom et al. | |
| 2019/0044135 A1* | 2/2019 | Du | H01M 4/621 |
| 2020/0373582 A1 | 11/2020 | Nishino et al. | |
| 2023/0216047 A1* | 7/2023 | Zhang | H01M 4/131 429/223 |
| 2023/0411599 A1* | 12/2023 | Hanazaki | H01M 4/131 |

FOREIGN PATENT DOCUMENTS

| | | | | |
|---|---|---|---|---|
| CN | 115472838 A | * | 12/2022 | H01M 10/0525 |
| CN | 116169271 A | * | 5/2023 | H01M 4/366 |
| CN | 117254090 A | * | 12/2023 | H01B 7/12 |
| CN | 117810382 A | * | 4/2024 | C01G 53/04 |
| CN | 117855483 A | * | 4/2024 | |
| EP | 3179540 A1 | | 6/2017 | |
| JP | 59-117070 A | | 7/1984 | |
| JP | 2000-058068 A | | 2/2000 | |
| JP | 5094175 B2 | | 12/2012 | |
| JP | 2014127235 A | * | 7/2014 | |
| JP | 2017-534138 A | | 11/2017 | |
| JP | 6249399 B2 | | 12/2017 | |
| JP | 2019-003959 A | | 1/2019 | |
| KR | 20210106310 A | * | 8/2021 | |
| WO | 2013/136441 A1 | | 9/2013 | |
| WO | 2014/156165 A1 | | 10/2014 | |
| WO | 2019/044168 A1 | | 3/2019 | |
| WO | WO-2019132332 A1 | * | 7/2019 | C01G 53/006 |
| WO | WO-2020067795 A1 | * | 4/2020 | C01G 25/02 |

OTHER PUBLICATIONS

International Search Report dated Dec. 22, 2020, issued in counterpart application No. PCT/JP2020/038923, w/ English translation (5 pages).

Written Opinion dated Dec. 22, 2020, issued in counterpart application No. PCT/JP2020/038923 (4 pages).

Office Action dated Feb. 5, 2024, issued in counterpart IN Application No. 202247036102, with English translation. (2 pages).

Office Action dated Feb. 20, 2024, issued in counterpart IN Application No. 202247036102, with English translation. (2 pages).

Office Action dated Feb. 2, 2024, issued in counterpart CN Application No. 202080089373.4, with partial English translation. (16 pages).

* cited by examiner

ELECTRODE FOR NONAQUEOUS ELECTROLYTE SECONDARY BATTERIES, AND NONAQUEOUS ELECTROLYTE SECONDARY BATTERY

CROSS REFERENCE TO RELATED APPLICATIONS

This application is a National Stage Application filed under 35 U.S.C. § 371 of International Application No. PCT/JP2020/038923 filed on Oct. 15, 2020 which claims the benefit of priority under 35 U.S.C. § 119 (a) of Japanese Patent Application No. 2019-237117 filed on Dec. 26, 2019, the contents of which are incorporated herein by reference.

TECHNICAL FIELD

The present disclosure relates to an electrode for a non-aqueous electrolyte secondary battery and a non-aqueous electrolyte secondary battery.

BACKGROUND

In recent years, as a secondary battery having high output and high energy density, a non-aqueous electrolyte secondary battery that performs charging and discharging by moving lithium ions between a positive electrode and a negative electrode has been widely used.

There is a nail penetration test as a safety evaluation test for confirming resistance to an internal short circuit of a battery. The nail penetration test is, for example, a test in which a nail penetrates into a battery to simulatively generate an internal short circuit and a degree of heat generation is examined to confirm safety of the battery. It is important to suppress the heat generation of the battery at the time of the nail penetration from the viewpoint of securing the safety of the battery.

For example, Patent Literature 1 discloses a technique for suppressing heat generation of a battery in a nail penetration test by disposing a coating layer containing a functional material selected from a phosphorus-containing compound, a nitrogen-containing compound, and an inorganic silicon compound on a surface of an electrode plate of a positive electrode or a negative electrode.

For example, Patent Literature 2 discloses a technique for suppressing an increase in temperature at the time of abnormal heat generation of a battery by disposing an intermediate layer containing polyphosphate between a positive electrode and a negative electrode.

CITATION LIST

Patent Literature

Patent Literature 1: JP 2017-534138 A
Patent Literature 2: JP 6249399 B

SUMMARY

When a coating layer of a functional material or an intermediate layer of polyphosphate is disposed on a surface of an electrode plate as in Patent Literatures 1 and 2, there is a concern that these layers become resistors and resistance of the battery is increased.

An electrode for a non-aqueous electrolyte secondary battery according to an aspect of the present disclosure includes a current collector, an active material layer that is formed on the current collector, and an aggregate of filler particles that is present on a surface of the active material layer. The filler particles are particles containing at least one of boron oxide, potassium pyrosulfate, and a compound containing an alkali metal or Br, a transformation point of the filler particle at which the filler particle is transformed from a solid phase into a liquid phase or is thermally decomposed is in a range of 180° C. to 650° C., and the compound containing an alkali metal or Br contains at least one of a borate, a silicate, a carbonate, a hydrogen carbonate, a citrate, and an aromatic compound.

A non-aqueous electrolyte secondary battery according to an aspect of the present disclosure includes a positive electrode and a negative electrode, and at least one of the positive electrode and the negative electrode is the electrode for a non-aqueous electrolyte secondary battery.

According to the present disclosure, it is possible to suppress heat generation of a battery in a nail penetration test.

DESCRIPTION OF EMBODIMENTS

Hereinafter, embodiments of the present disclosure will be described with reference to the drawings.

Figure 1:
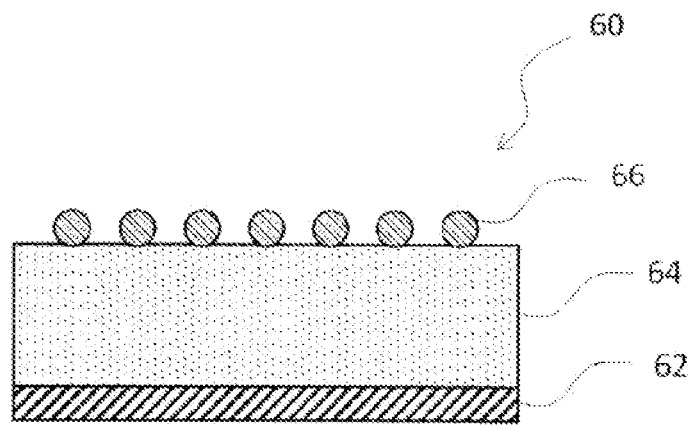
FIG. 1 is a schematic cross-sectional view illustrating an example of a configuration of an electrode according to the present embodiment.
Figure 2:
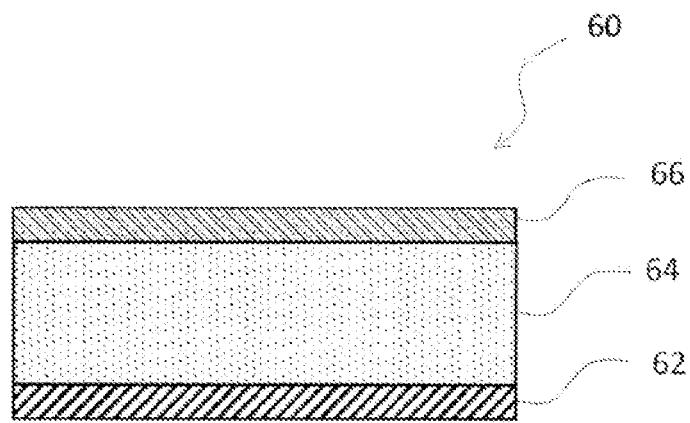
FIG. 2 is a schematic cross-sectional view illustrating an example of a configuration of an electrode according to the present embodiment.

FIGS. 1 and 2 are schematic cross-sectional views each illustrating an example of a configuration of an electrode according to the present embodiment. An electrode 60 illustrated in FIGS. 1 and 2 is an electrode for a non-aqueous electrolyte secondary battery, and is applied to at least one of a positive electrode and a negative electrode of a non-aqueous electrolyte secondary battery.

The electrode 60 illustrated in FIGS. 1 and 2 includes a current collector 62, an active material layer 64 that is formed on the current collector 62, and an aggregate 66 of filler particles that is present on a surface of the active material layer 64. In the electrode 60 illustrated in FIG. 1, the aggregate 66 of filler particles is formed in an island shape. On the other hand, in the electrode 60 illustrated in FIG. 2, the aggregate 66 of filler particles is formed in a film shape and covers the entire surface of the active material layer 64. The aggregate 66 is an aggregation of a plurality of filler particles.

The filler particles constituting the aggregate 66 are particles containing at least one of boron oxide, potassium pyrosulfate, and a compound containing an alkali metal or Br, and a transformation point of the filler particle at which the filler particle is transformed from a solid phase into a liquid phase or is thermally decomposed is in a range of 180° C. to 650° C. However, the compound containing an alkali metal or Br contains at least one of a borate, a silicate, a carbonate, a hydrogen carbonate, a citrate, and an aromatic compound.

By using the electrode for a non-aqueous electrolyte secondary battery according to the present embodiment, an increase in battery temperature in a nail penetration test is suppressed. This mechanism is not sufficiently clear, but the following is presumed. Due to heat generation of the battery at the time of the nail penetration test, that is, heat generation of the battery when a nail penetrates into the battery and an internal short circuit is simulatively generated, the filler particles constituting the aggregate 66 are transformed from a solid phase into a liquid phase, and a coating film having high flame retardancy and low conductivity is formed on the surface of the active material layer 64. Then, the coating film becomes a resistor component, and the amount of short circuit current flowing between the positive and negative electrodes through the nail is suppressed. As a result, an increase in battery temperature in the nail penetration test is also suppressed. The formation of the coating film after the transformation of the filler particles into the liquid phase depends on the type of filler particle, and is performed by, for example, a thermal fusion reaction, a dehydration condensation reaction, a thermal polymerization reaction, or the like.

In addition, the electrode for a non-aqueous electrolyte secondary battery according to the present embodiment may be capable of suppressing an increase in battery resistance. This mechanism is not sufficiently clear, but the following is presumed. It is considered that although ion conductivity of a filler material forming the filler particles is not high, in the case of the island-shaped aggregate 66 illustrated in FIG. 1, since a gap between the aggregates 66 is a path through which ions such as lithium ions easily pass, the ions such as lithium ions can move more smoothly between the positive and negative electrodes, and the increase in battery resistance is further suppressed.

Hereinafter, a constituent material of the electrode 60 will be described in more detail.

A borate containing an alkali metal or Br for the filler particle is not particularly limited as long as the transformation point at which the filler particle is transformed from a solid phase into a liquid phase or is thermally decomposed is in a range of 180° C. to 650° C., and examples thereof include alkali metal borates such as borate-sodium salt and borate-potassium salt.

In addition, a silicate containing an alkali metal or Br for the filler particle is not particularly limited as long as the transformation point at which the filler particle is transformed from a solid phase into a liquid phase or is thermally decomposed is in a range of 180° C. to 650° C., and examples thereof include alkali metal silicates such as silicate-sodium salt and silicate-potassium salt.

In addition, a carbonate or hydrogen carbonate containing an alkali metal or Br for the filler particle is not particularly limited as long as the transformation point at which the filler particle is transformed from a solid phase into a liquid phase or is thermally decomposed is in a range of 180° C. to 650° C., and examples thereof include alkali metal carbonates such as potassium carbonate and sodium carbonate, alkali metal hydrogen carbonates such as potassium hydrogen carbonate and sodium hydrogen carbonate, and carbonates containing Br such as BC-52 tetrabromobisphenol A.

In addition, a citrate containing an alkali metal or Br for the filler particle is not particularly limited as long as the transformation point at which the filler particle is transformed from a solid phase into a liquid phase or is thermally decomposed is in a range of 180° C. to 650° C., and examples thereof include alkali metal citrates such as potassium citrate and sodium citrate.

In addition, an aromatic compound containing an alkali metal or Br for the filler particle is not particularly limited as long as the transformation point at which the filler particle is transformed from a solid phase into a liquid phase or is thermally decomposed is in a range of 180° C. to 650° C., and examples thereof include aromatic compounds containing an alkali metal such as ethylene-1,2-bis(pentabromophenyl) and ethylenebistetrabromophthalimide, and aromatic compounds containing Br such as polybrominated diphenyl ether.

For the filler particle, a borate containing at least one of boron oxide, potassium pyrosulfate, Na, and K, a silicate containing at least one of Na and K, a carbonate containing at least one of Na and K, a hydrogen carbonate containing at least one of Na and K, a citrate containing at least one of Na and K, and an aromatic compound containing Br are preferable, and boron oxide, potassium pyrosulfate, sodium silicate, potassium carbonate, potassium hydrogen carbonate, potassium citrate, ethylene-1,2-bis(pentabromophenyl), and ethylenebistetrabromophthalimide are more preferable, from the viewpoint of effectively suppressing an increase in battery temperature or an increase in battery resistance in the nail penetration test. These materials may be used alone or in combination of two or more thereof.

The transformation point of the filler particle may be in a range of 180° C. to 650° C. and is preferably in a range of 250° C. to 550° C. so that the filler particle is appropriately transformed from a solid phase into a liquid phase due to heat generation of the battery in the nail penetration test.

A covering rate of the aggregate 66 to the surface of the active material layer 64 is preferably 90% or less, and more preferably 60% or less, from the viewpoint of suppressing an increase in battery resistance. In addition, the covering rate of the aggregate 66 to the surface of the active material layer 64 is preferably 5% or more, and more preferably 10% or more, from the viewpoint of suppressing an increase in battery temperature in the nail penetration test. In the case of the aggregate 66 illustrated in FIG. 2, the covering rate of the aggregate 66 to the surface of the active material layer 64 is 100%. The covering rate of the aggregate 66 is calculated as follows.

The covering rate is determined by performing element mapping of the electrode surface by energy dispersive X-ray spectrometry (SEM-EDX) or the like. For example, the covering rate of the aggregate 66 to the surface of the active material layer 64 is calculated by element mapping of the filler particle and the active material by element mapping.

An average thickness of the island-shaped aggregate 66 illustrated in FIG. 1 is preferably 10 µm or less from the viewpoint of suppressing an increase in battery resistance. The average thickness of the island-shaped aggregate 66 is preferably 0.3 µm or more from the viewpoint of suppressing an increase in battery temperature in the nail penetration test. The average thickness of the film-shaped aggregate 66 illustrated in FIG. 2 is preferably 3 µm or less from the viewpoint of suppressing an increase in battery resistance, and is preferably 0.3 µm or more from the viewpoint of suppressing an increase in battery temperature in the nail penetration test.

An average particle diameter of the filler particles is preferably 0.01 µm to 5 µm, and is more preferably in a range of 0.05 µm to 3 µm. When the average particle diameter of the filler particles satisfies the above range, the filler particles are rapidly transformed from a solid phase into a liquid phase due to heat generation of the battery at the time of the nail penetration test as compared with a case where the average particle diameter of the filler particles does not satisfy the above range. Thus, an increase in battery temperature in the nail penetration test can be effectively suppressed. An average particle diameter of primary particles is determined as follows. First, 20 filler particles are randomly selected from an SEM image of the electrode surface. Next, grain boundaries of the selected 20 filler particles are observed, an outer shape of the filler particle is specified, a major diameter of each of the 20 filler particles is determined, and an average value thereof is taken as the average particle diameter of the filler particles.

The aggregate 66 may contain a binder in addition to the filler particles described above. By containing the binder, a binding property between the filler particles or a binding property between the filler particles and the current collector 62 can be improved. The binder is not particularly limited, and examples thereof include polyvinylidene fluoride (PVdF), ethylene dimethacrylate, allyl methacrylate, t-dodecyl mercaptan, α-methylstyrene dimer, and methacrylic acid. Polyvinylidene fluoride (PVdF), ethylene dimethacrylate, allyl methacrylate, t-dodecyl mercaptan, α-methylstyrene dimer, and methacrylic acid can allow the electrode 60 to adhere to a separator 13 by applying a pressure and/or heat to the aggregate 66. In addition, the aggregate 66 may contain compound particles in addition to the filler particles described above. Examples of the compound particles in addition to the filler particles described above include inorganic particles formed of alumina, boehmite, titania, and the like.

In a case where the electrode 60 is used as a positive electrode, as the current collector 62 to be a positive electrode current collector, for example, a foil of a metal stable in a potential range of the positive electrode, such as aluminum, a film in which the metal is disposed on a surface layer, or the like can be used. In addition, it is preferable that the active material layer 64 to be a positive electrode active material layer contains a positive electrode active material and contains a conductive agent or a binder.

Examples of the positive electrode active material include lithium-transition metal composite oxides. Specifically, lithium cobaltate, lithium manganate, lithium nickelate, lithium nickel manganese composite oxide, lithium nickel cobalt composite oxide, and the like can be used, and Al, Ti, Zr, Nb, B, W, Mg, Mo, and the like may be added to these lithium-transition metal composite oxides.

As the conductive agent, carbon powders such as carbon black, acetylene black, Ketjen black, and graphite may be used alone or in combination of two or more thereof.

Examples of the binder include a fluorine-based resin such as polytetrafluoroethylene (PTFE) or polyvinylidene fluoride (PVdF), polyacrylonitrile (PAN), a polyimide-based resin, an acrylic resin, and a polyolefin-based resin. These binders may be used alone or in combination of two or more thereof.

An example of a method for producing a positive electrode will be described. First, a positive electrode mixture slurry containing a positive electrode active material, a binder, a conductive agent, a solvent, and the like is applied onto a positive electrode current collector, and the coating film is dried and then compressed, thereby forming a positive electrode active material layer on the positive electrode current collector. Next, a filler slurry containing filler particles, a binder, a solvent, and the like is prepared. Then, the prepared filler slurry is sprayed, dropped, or applied to the positive electrode active material layer, and drying is performed to form an aggregate of filler particles that is present on a surface of the positive electrode active material layer. Examples of the solvent contained in the slurry include water and N-methyl-2-pyrrolidone (NMP).

Here, for example, the island-shaped aggregate illustrated in FIG. 1 or the film-shaped aggregate illustrated in FIG. 2 can be formed by adjusting the amounts of the filler particles and the solvent contained in the filler slurry. In the case of forming the island-shaped aggregate illustrated in FIG. 1, for example, it is preferable that the filler particles are added in an amount of 10 to 60% to 100 ml of the solvent. In the case of forming the film-shaped aggregate illustrated in FIG. 2, for example, it is preferable that the filler particles are added in an amount of 80% or more with respect to 100 ml of the solvent. In addition, for example, the island-shaped aggregate illustrated in FIG. 1 or the film-shaped aggregate illustrated in FIG. 2 can be formed by controlling the spray amount, the dropping amount, or the applied amount of the filler slurry. In addition, the island-shaped aggregate illustrated in FIG. 1 can also be obtained by, for example, disposing a masking sheet or the like provided with a plurality of through-holes having a predetermined size on the positive electrode active material layer, and spraying, dropping, or applying the filler slurry from above the disposed masking sheet.

In a case where the electrode 60 is used as a negative electrode, as the current collector 62 to be a negative electrode current collector, for example, a foil of a metal stable in a potential range of the negative electrode, such as copper, a film in which the metal is disposed on a surface layer, or the like can be used. In addition, it is preferable that the active material layer 64 to be a negative electrode active material layer contains a negative electrode active material and contains a binder and the like.

As the negative electrode active material, a carbon material capable of occluding and releasing lithium ions can be used, and in addition to graphite, non-graphitizable carbon, graphitizable carbon, fibrous carbon, coke, carbon black, and the like can be used. Furthermore, as a non-carbon-based material, silicon, tin, and a metal or an oxide mainly containing silicon and tin can be used.

Examples of the binder include a fluorine-based resin, PAN, a polyimide-based resin, an acrylic resin, a polyolefin-based resin, styrene-butadiene rubber (SBR), nitrile-butadiene rubber (NBR), carboxymethyl cellulose (CMC) or a salt thereof, polyacrylic acid (PAA) or a salt thereof (PAA-Na, PAA-K, and the like, or a partially neutralized salt may be used), and polyvinyl alcohol (PVA). These binders may be used alone or in combination of two or more thereof.

An example of a method for producing a negative electrode will be described below. First, a negative electrode mixture slurry containing a negative electrode active material, a binder, a solvent, and the like is applied onto a negative electrode current collector, and the coating film is dried and then compressed, thereby forming a negative electrode active material layer on the negative electrode current collector. Next, a filler slurry containing filler particles, a binder, a solvent, and the like is sprayed, dropped, or applied to the negative electrode active material layer, and drying is performed to form an aggregate of filler particles that is present on a surface of the negative electrode active material layer. A method for obtaining an island-shaped aggregate or a film-shaped aggregate is as described above.

Hereinafter, an example of the non-aqueous electrolyte secondary battery according to the present embodiment will be described.

Figure 3:
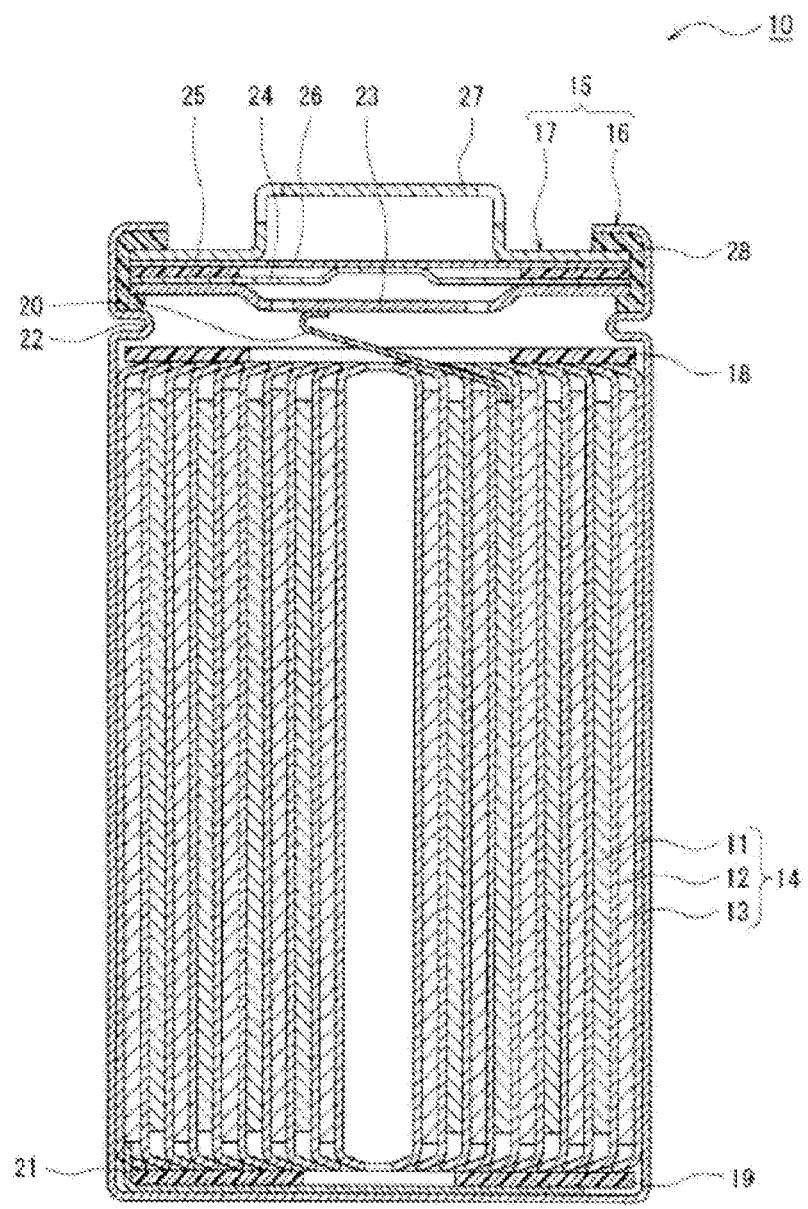
FIG. 3 is a schematic cross-sectional view illustrating a non-aqueous electrolyte secondary battery as an example of an embodiment.

FIG. 3 is a schematic cross-sectional view illustrating a non-aqueous electrolyte secondary battery as an example of an embodiment. A non-aqueous electrolyte secondary battery 10 illustrated in FIG. 3 includes a wound electrode assembly 14 formed by wounding a positive electrode 11 and a negative electrode 12 with a separator 13 interposed therebetween, a non-aqueous electrolyte, insulating plates 18 and 19 that are disposed on upper and lower sides of the electrode assembly 14, respectively, and a battery case 15 housing the members. The battery case 15 includes a bottomed cylindrical case main body 16 and a sealing assembly 17 for closing an opening of the case main body 16. Instead of the wound electrode assembly 14, another form of an electrode assembly such as a stacked electrode assembly in which a positive electrode and a negative electrode are alternately stacked with a separator interposed therebetween may be applied. In addition, examples of the battery case 15 include a metal case having a cylindrical shape, a square shape, a coin shape, a button shape, or the like, and a resin case formed by laminating resin sheets (so-called laminate type resin case).

The case main body 16 is, for example, a bottomed cylindrical metal container. A gasket 28 is provided between the case main body 16 and the sealing assembly 17 to secure a sealing property of the inside of the battery. The case main body 16 has, for example, a projection part 22 in which a part of a side part thereof projects inside for supporting the sealing assembly 17. The projection part 22 is preferably formed in an annular shape along a circumferential direction of the case main body 16, and supports the sealing assembly 17 on an upper surface thereof.

The sealing assembly 17 has a structure in which a filter 23, a lower vent member 24, an insulating member 25, an upper vent member 26, and a cap 27 are sequentially stacked from the electrode assembly 14 side. Each member constituting the sealing assembly 17 has, for example, a disk shape or a ring shape, and the respective members except for the insulating member 25 are electrically connected to each other. The lower vent member 24 and the upper vent member 26 are connected to each other at the respective central parts thereof, and the insulating member 25 is interposed between the respective circumferential parts of the vent members 24 and 26. When the internal pressure of the non-aqueous electrolyte secondary battery 10 is increased by heat generation due to an internal short circuit or the like, for example, the lower vent member 24 is deformed so as to push the upper vent member 26 up toward the cap 27 side and is broken, and thus, a current pathway between the lower vent member 24 and the upper vent member 26 is cut off. When the internal pressure is further increased, the upper vent member 26 is broken, and gas is discharged through the opening of the cap 27.

In the non-aqueous electrolyte secondary battery 10 illustrated in FIG. 3, a positive electrode lead 20 attached to the positive electrode 11 extends through a through-hole of the insulating plate 18 toward a side of the sealing assembly 17, and a negative electrode lead 21 attached to the negative electrode 12 extends through the outside of the insulating plate 19 toward the bottom side of the case main body 16. The positive electrode lead 20 is connected to a lower surface of the filter 23 that is a bottom plate of the sealing assembly 17 by welding or the like, and the cap 27 that is a top plate of the sealing assembly 17 electrically connected to the filter 23 becomes a positive electrode terminal. The negative electrode lead 21 is connected to a bottom inner surface of the case main body 16 by welding or the like, and the case main body 16 becomes a negative electrode terminal.

The electrode 60 is applied to at least one of the positive electrode 11 and the negative electrode 12. For the separator 13, a porous sheet having an ion permeation property and an insulation property is used. Specific examples of the porous sheet include a fine porous thin film, a woven fabric, and a non-woven fabric. As a material of the separator 13, an olefin-based resin such as polyethylene or polypropylene, cellulose, and the like are preferable. The separator 13 may be a laminate including a cellulose fiber layer and a thermoplastic resin fiber layer formed of an olefin-based resin or the like. In addition, a multi-layer separator including a polyethylene layer and a polypropylene layer may be used, or a separator obtained by applying a material such as an aramid-based resin or ceramic onto a surface of the separator 13 may be used.

The non-aqueous electrolyte contains a non-aqueous solvent and an electrolyte salt dissolved in the non-aqueous solvent. As the non-aqueous solvent, for example, esters, ethers, nitriles, amides, a mixed solvent of two or more thereof, and the like are used. The non-aqueous solvent may contain a halogen-substituted solvent in which at least some hydrogens in these solvents are substituted with halogen atoms such as fluorine. As the electrolyte salt, for example, a lithium salt such as $LiPF_6$ is used.

Next, Examples will be described.

EXAMPLES

Example 1

[Production of Positive Electrode]

100 parts by weight of a positive electrode active material represented by $LiNi_{0.82}Co_{0.15}Al_{0.03}O_2$, 1 part by weight of acetylene black (AB), and 1 part by weight of polyvinylidene fluoride (PVdF) were mixed, and an appropriate amount of N-methyl-2-pyrrolidone (NMP) was further added, thereby preparing a positive electrode mixture slurry. Next, the positive electrode mixture slurry was applied onto both surfaces of a positive electrode current collector formed of an aluminum foil, and the positive electrode current collector was dried. The positive electrode current collector was cut into a predetermined electrode size and was rolled using a roller to form a positive electrode active material layer on the both surfaces of the positive electrode current collector. Next, 94 parts by weight of sodium silicate ($Na_2SiO_3$) particles and 6 parts by weight of polyvinylidene fluoride (PVdF) were mixed, and 400 parts by weight of N-methyl-2-pyrrolidone (NMP) was further added, thereby preparing a filler slurry. The filler particles were applied onto the entire surface of the positive electrode active material layer so that the amount thereof was 4 g/m$^2$, and the positive electrode active material layer was dried. The positive electrode active material layer was used as a positive electrode of Example 1.

When a surface of the positive electrode of Example 1 was observed by SEM-EDX, a distribution of the sodium silicate ($Na_2SiO_3$) particles was confirmed, and a covering rate of the sodium silicate ($Na_2SiO_3$) particles was 30%.

[Production of Negative Electrode]

100 parts by weight of a graphite powder, 1 part by weight of carboxymethyl cellulose (CMC), and 1 part by weight of styrene-butadiene rubber (SBR) were mixed, and water was further added, thereby preparing a negative electrode mixture slurry. Next, the negative electrode mixture slurry was applied onto both surfaces of a negative electrode current collector formed of a copper foil, and the negative electrode current collector was dried. The negative electrode current collector was cut into a predetermined electrode size and was rolled using a roller to form a negative electrode active material layer on the both surfaces of the negative electrode current collector.

[Preparation of Non-Aqueous Electrolyte]

Lithium hexafluorophosphate (LiPF$_6$) was dissolved in a mixed solvent obtained by mixing ethylene carbonate (EC), ethyl methyl carbonate (EMC), and dimethyl carbonate (DMC) at a volume ratio of 3:3:4 so that a concentration thereof was 1 mol/liter to prepare a non-aqueous electrolyte.

[Production of Non-Aqueous Electrolyte Secondary Battery]

(1) A positive electrode lead was attached to a positive electrode current collector, a negative electrode lead was attached to a negative electrode current collector, and then, a positive electrode and a negative electrode were wound with a separator formed of polyethylene interposed therebetween, thereby producing a wound electrode assembly.

(2) Insulating plates were disposed on upper and lower sides of the electrode assembly, respectively, a negative electrode lead was welded to a case main body, a positive electrode lead was welded to a sealing assembly, and the electrode assembly was housed in the case main body.

(3) A non-aqueous electrolyte liquid was injected into the case main body by a pressure reduction method, and then, an end part of an opening of the case main body was sealed with the sealing assembly via a gasket. This was used as a non-aqueous electrolyte secondary battery.

Example 2

A non-aqueous electrolyte secondary battery was produced in the same manner as in Example 1, except that sodium silicate (Na$_2$SiO$_3$) was replaced with potassium pyrosulfate (K$_2$S$_2$O$_7$) particles in the preparation of the filler slurry. When a surface of the positive electrode of Example 2 was observed by SEM-EDX, a distribution of the potassium pyrosulfate (K$_2$S$_2$O$_7$) particles was confirmed, and a covering rate of the potassium pyrosulfate (K$_2$S$_2$O$_7$) particles was 30%.

Example 3

A non-aqueous electrolyte secondary battery was produced in the same manner as in Example 1, except that sodium silicate (Na$_2$SiO$_3$) was replaced with boron oxide (B$_2$O$_3$) particles in the preparation of the filler slurry. When a surface of the positive electrode of Example 3 was observed by SEM-EDX, a distribution of the boron oxide (B$_2$O$_3$) particles was confirmed, and a covering rate of the boron oxide (B$_2$O$_3$) particles was 30%.

Example 4

A non-aqueous electrolyte secondary battery was produced in the same manner as in Example 1, except that sodium silicate (Na$_2$SiO$_3$) was replaced with ethylene-1,2-bis(pentabromophenyl) particles in the preparation of the filler slurry. When a surface of the positive electrode of Example 4 was observed by SEM-EDX, a distribution of the ethylene-1,2-bis(pentabromophenyl) particles was confirmed, and a covering rate of the ethylene-1,2-bis(pentabromophenyl) particles was 30%.

Example 5

A non-aqueous electrolyte secondary battery was produced in the same manner as in Example 1, except that sodium silicate (Na$_2$SiO$_3$) was replaced with ethylenebistetrabromophthalimide particles in the preparation of the filler slurry. When a surface of the positive electrode of Example 5 was observed by SEM-EDX, a distribution of the ethylenebistetrabromophthalimide particles was confirmed, and a covering rate of the ethylenebistetrabromophthalimide particles was 30%.

Example 6

A non-aqueous electrolyte secondary battery was produced in the same manner as in Example 1, except that sodium silicate (Na$_2$SiO$_3$) was replaced with potassium citrate (C$_6$H$_5$K$_3$O$_7$) particles in the preparation of the filler slurry. When a surface of the positive electrode of Example 6 was observed by SEM-EDX, a distribution of the potassium citrate (C$_6$H$_5$K$_3$O$_7$) particles was confirmed, and a covering rate of the potassium citrate (C$_6$H$_5$K$_3$O$_7$) particles was 25%.

Example 7

A non-aqueous electrolyte secondary battery was produced in the same manner as in Example 1, except that sodium silicate (Na$_2$SiO$_3$) was replaced with potassium carbonate (K$_2$CO$_3$) particles in the preparation of the filler slurry. When a surface of the positive electrode of Example 7 was observed by SEM-EDX, a distribution of the potassium carbonate (K$_2$CO$_3$) particles was confirmed, and a covering rate of the potassium carbonate (K$_2$CO$_3$) particles was 25%.

Example 8

A non-aqueous electrolyte secondary battery was produced in the same manner as in Example 1, except that sodium silicate (Na$_2$SiO$_3$) was replaced with sodium carbonate (Na$_2$CO$_3$) particles in the preparation of the filler slurry. When a surface of the positive electrode of Example 8 was observed by SEM-EDX, a distribution of the sodium carbonate (Na$_2$CO$_3$) particles was confirmed, and a covering rate of an aggregate of the sodium carbonate (Na$_2$CO$_3$) particles was 30%.

Example 9

94 parts by weight of potassium citrate (C$_6$H$_5$K$_3$O$_7$) particles and 60 parts by weight of polyvinylidene fluoride (PVdF) were mixed, and 25 parts by weight of N-methyl-2-pyrrolidone (NMP) was further added, thereby preparing a filler slurry. 10 mL of the filler slurry was applied onto the entire surface of the positive electrode active material layer, and the positive electrode active material layer was dried. A non-aqueous electrolyte secondary battery was produced in the same manner as in Example 1, except that the positive electrode active material layer was used as a positive electrode of Example 9. When a surface of the positive electrode of Example 9 was observed by SEM-EDX, a covering rate of the potassium citrate (C$_6$H$_5$K$_3$O$_7$) particles was 100%. The covering rate of 100% is a state in which (strength of active material component)/(strength of filler particle component) is a detection lower limit when element mapping is performed by SEM-EDX.

Comparative Example 1

A non-aqueous electrolyte secondary battery was produced in the same manner as in Example 1, except that the filler slurry was not used.

[Nail Penetration Test]

The non-aqueous electrolyte secondary batteries of Examples 1 to 9 and Comparative Example 1 were subjected to a nail penetration test in the following procedure.

(1) Under an environment of 25° C., charging was performed at a constant current of 600 mA until a battery voltage reached 4.2 V, and then, charging was continuously performed at a constant voltage until a current value reached 90 mA.

(2) Under an environment of 25° C., a tip of a round nail having a thickness of 2.7 mmφ was brought into contact with the central part of a side surface of the battery charged in (1), the round nail penetrated in a stacking direction of the electrode assembly in the battery at a speed of 1 mm/sec, and the penetration of the round nail was stopped immediately after a battery voltage drop due to an internal short circuit was detected.

(3) A temperature of a surface of the battery was measured 1 minute after a short circuit of the battery was started by the round nail. The measured temperature was summarized in Table 1 as the temperature after the nail penetration test.

[Battery Resistance]

The battery resistance of each of the non-aqueous electrolyte secondary batteries of Examples 1 to 9 and Comparative Example 1 was measured as follows. Under a temperature environment of 25° C., the non-aqueous electrolyte secondary battery was charged at a constant current of 0.3 C until the battery voltage reached 4.2 V, the non-aqueous electrolyte secondary battery was charged at a constant voltage until the current value reached 0.05 C, and then, the non-aqueous electrolyte secondary battery was discharged at a constant current of 0.3 C to set SOC to 50%. Next, voltage values when discharge currents of 0 A, 0.1 A, 0.5 A, and 1.0 A were applied for 10 seconds were acquired. DC-IR was calculated from an absolute value of a slope when the voltage value after 10 seconds to each discharge current value was linearly approximated by a least-square method, and the value was summarized in Table 1 as the battery resistance.

TABLE 1

| | Filler particles | Covering rate of aggregate (%) | Battery resistance (mΩ) | Temperature after nail penetration test (° C.) |
|---|---|---|---|---|
| Example 1 | Sodium silicate $Na_2SiO_3$ | 30 | 51 | 490 |
| Example 2 | Potassium pyrosulfate $K_2S_2O_7$ | 30 | 50 | 490 |
| Example 3 | Boron oxide $B_2O_3$ | 30 | 50 | 500 |
| Example 4 | Ethylene-1,2-bis (pentabromophenyl) | 30 | 49 | 500 |
| Example 5 | Ethylenebistetrabromophthalimide | 30 | 49 | 500 |
| Example 6 | Potassium citrate $C_6H_5K_3O_7$ | 25 | 50 | 490 |
| Example 7 | Potassium carbonate $K_2CO_3$ | 25 | 50 | 490 |
| Example 8 | Sodium carbonate $Na_2CO_3$ | 30 | 50 | 500 |
| Example 9 | Potassium citrate ($C_6H_5K_3O_7$) | 100 | 320 | 310 |
| Comparative Example 1 | None | — | 49 | 630 |

As shown in Table 1, in all of Examples 1 to 9 in which the aggregate of the filler particles was present on the surface of the positive electrode active material layer, the battery temperature after the nail penetration test was lower than that in Comparative Example 1 in which the filler particles were absent on the surface of the positive electrode active material layer. In addition, in Examples 1 to 8, it is considered that since the covering rate of the aggregate to the surface of the positive electrode active material layer is 90% or less, the movement path of the ions such as lithium ions is formed between the aggregates, and an increase in battery resistance is suppressed.

REFERENCE SIGNS LIST

10 Non-aqueous electrolyte secondary battery
11 Positive electrode
12 Negative electrode
13 Separator
14 Electrode assembly
15 Battery case
16 Case main body
17 Sealing assembly
18, 19 Insulating plate
20 Positive electrode lead
21 Negative electrode lead
22 Projection part
23 Filter
24 Lower vent member
25 Insulating member
26 Upper vent member
27 Cap
28 Gasket
60 Electrode
62 Current collector
64 Active material layer
66 Aggregate

The invention claimed is:

1. An electrode for a non-aqueous electrolyte secondary battery comprising:
   a current collector; an active material layer that is formed on the current collector; and an aggregate of filler particles that is present on a surface of the active material layer,
   wherein the filler particles are particles containing at least one of potassium pyrosulfate, and a compound containing an alkali metal or Br,
   a transformation point of the filler particle at which the filler particle is transformed from a solid phase into a liquid phase or is thermally decomposed is in a range of 180 to 650° C.,
   the compound containing an alkali metal or Br contains at least one of a borate, a citrate, and an aromatic compound, and
   an average particle diameter of the filler particles is 0.05 µm to 3 µm.

2. The electrode for a non-aqueous electrolyte secondary battery according to claim 1, wherein the alkali metal is at least one of Na and K.

3. The electrode for a non-aqueous electrolyte secondary battery according to claim 1, wherein the filler particles contain at least one of potassium pyrosulfate, potassium citrate, ethylene-1,2-bis(pentabromophenyl), and ethylenebistetrabromophthalimide.

4. The electrode for a non-aqueous electrolyte secondary battery according to claim 1, wherein a covering rate of the aggregate to the surface of the active material layer is 10% to 60%, and an average thickness of the aggregate is 10 µm or less.

5. A non-aqueous electrolyte secondary battery comprising:
   a positive electrode; and a negative electrode,
   wherein at least one of the positive electrode and the negative electrode is the electrode for a non-aqueous electrolyte secondary battery according to claim 1.

* * * * *